United States Patent [19]

Mills

[11] Patent Number: 4,572,106
[45] Date of Patent: Feb. 25, 1986

[54] TEAT CUP MILKING INFLATION OR LINER

[76] Inventor: Geoffrey S. Mills, 3 Olympia Pl., Hamilton, New Zealand

[21] Appl. No.: 677,840

[22] Filed: Dec. 4, 1984

[30] Foreign Application Priority Data

Dec. 21, 1983 [NZ] New Zealand .......................... 206657

[51] Int. Cl.$^4$ ................................................ A01J 5/08
[52] U.S. Cl. ................................ 119/14.47; 119/14.52
[58] Field of Search ............... 119/14.49, 14.50, 14.51, 119/14.52, 14.53, 14.47, 14.48

[56] References Cited

U.S. PATENT DOCUMENTS

| | | | |
|---|---|---|---|
| 1,220,172 | 3/1917 | Berthelsen | 119/14.52 |
| 2,997,980 | 8/1961 | Noorlander | 119/14.49 X |
| 3,289,634 | 12/1966 | Simons | 119/14.52 |

FOREIGN PATENT DOCUMENTS 119963 5/1927 Switzerland ..................... 119/14.52
2107565 5/1983 United Kingdom ............. 119/14.47

Primary Examiner—Hugh R. Chamblee
Attorney, Agent, or Firm—Poms, Smith, Lande & Rose

[57] ABSTRACT

A milking inflation or liner of the soft tubular rubber kind arranged for fitment in a rigid tubular teat cup shell to which pulsating air/vacuum is applied, the invention comprising the provision on the inner wall surface of the contained teat engaging body part of the inflation of a plurality of annular ripples or undulations at intervals along the major part of the length of the contained body part. The minimum bore at the peaks of the uppermost ripples or undulations being fractionally greater than the minimum bore at the peaks of the lowermost of the ripples or undulations. The arrangement provides for a positive but gentle grip on an animals teat to resist upward crawl and/or accidental dislodgement during milking operations, and further providing for stimulation of the animlas teat in assisting milk let-down.

6 Claims, 7 Drawing Figures

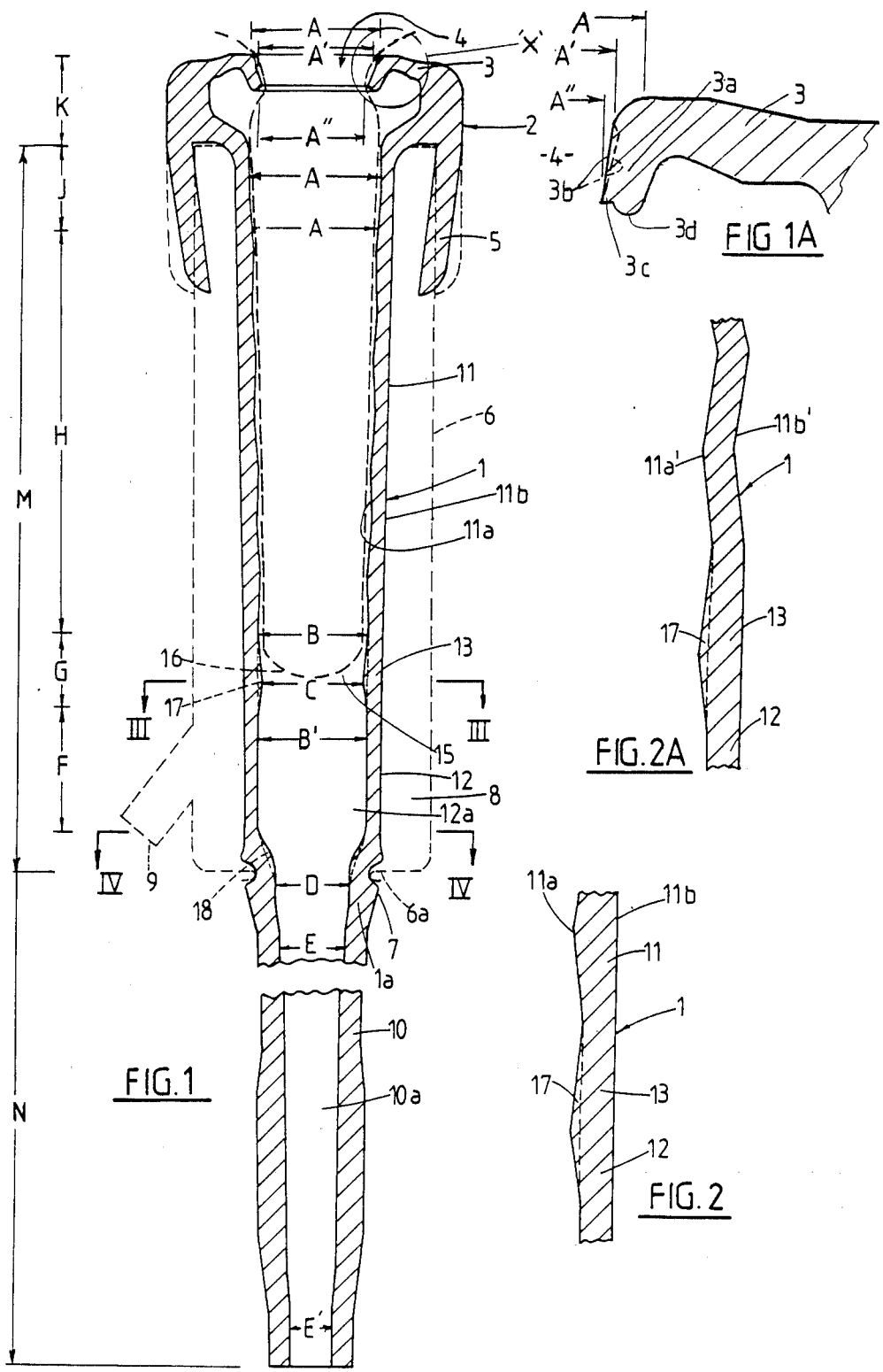

TEAT CUP MILKING INFLATION OR LINER

This invention relates to milking inflations for dairy equipment, and more particularly relates to the soft natural or synthetic rubber inflations of cylindrical tube form and arranged to be located and contained within an upright rigid tubular shell, with upper and lower portions of the inflation being sealably engaged or engageable with upper and lower parts of the shell so that there is an annular spaced formed about the contained inflation and to which a pulsating vacuum or pressure can be applied; the inflation having an upper collar part defining the inflation mouth and a lower end part connectable to a vacuum milk line.

Vacuum is applied to the milk line and as a result, during milking operations there is sometimes a tendency for the inflations to "crawl" upwardly of the animal's teat, and in some cases this may be detrimental to the milking operations and/or the comfort of the animal being milked by, for example, on animals with short teats the collar becoming tight and exerting pressure at the upper end thereof at the junction with the udder, and in animals with longer teats the teat lower end abutting and being partly drawn into the entry to the milk outlet bore at the base of the teat cup inflations to thus hamper milk flow into the bore and/or constrict the teat orifice and cause the animal discomfort as well as hampering milk let-down. Another problem involves the need for an inflation that will retain a firm grip on an animals teat so as to prevent air leakage and/or accidental dislodgement, but without being over-tight particularly at the collar part, so as to cause the animal discomfort or hamper milk let-down.

Accordingly, some objects of the present invention are to overcome the aforementioned disadvantages and provide a milking inflation having means to resist teat cup crawl and prevent complete blockage of the milk outlet bore opening, and to provide a firm but gentle grip on an animals teat to prevent air leakage or accidental dislodgement.

A further improvement object is to provide an inflation arrangement for improved teat stimulation and milk drawing action during milking operations.

Other and more particular objects and advantages of the invention will become apparent from the ensuing description.

According to a first aspect of this invention therefor, there is provided a teat cup milking inflation of the kind referred to and comprising a resilient upright substantially cylindrical tubular body part arranged to be located and contained within an upright rigid substantially cylindrical tubular shell with upper and lower portions of the body part being respectively sealably engageable with upper and lower parts of the shell, an annular space being formed about the contained body part and to which a pulsating vacuum or pressure can be applied; said contained body part being arranged for location about an animal's teat and having an open upper collar part defining the inflation mouth for teat entry, and the lower portion of the body being provided with a milk outlet connectable to a vacuum milk line; said tubular body part being characterised by the provision on its inner wall surface of a plurality of annular ripples or undulations at intervals along its length, with the minimum bore of the uppermost ones of the ripples or undulations being fractionally greater than the minimum bore of the lowermost of said ripples or undulations and said milk outlet being of substantially lesser diameter than the lowermost ripple or undulation.

According to a second aspect of this invention, there is provided the teat cup milking inflation of the preceding paragraph and wherein said contained body part is formed into an upper section having the plurality of ripples or undulations, and a communicating lower section with an intermediate junction portion of slightly lesser internal bore diameter than the minimum bore of the upper section being defined by the lowermost ripple or undulation, said lower section forming a collapsible chamber having its lower end part provided with the milk outlet connectable to a vacuum milk line.

Some preferred forms of the invention will now be described by way of example and with reference to the accompanying drawings, in which:

FIG. 1 is a longitudinal sectional view of one form of the invention in accordance with the invention and engaged with a typical rigid teat cup shell;

FIG. 1A is a fragmentary enlargement of the encircled collar part 'X' of FIG. 1;

FIG. 2 is a fragmentary long sectional enlargement of the junction portion of the arrangement shown in FIG. 1;

FIG. 2A is a fragmentary view similar to FIG. 2 and illustrating a variation in the wall formation of the inflation upper section;

Figure 3:
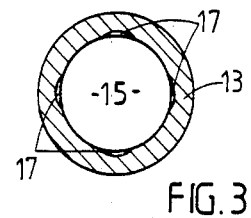
FIG. 3 is a plan view on line III—III of FIG. 1.

Modern milking inflations are generally preferably constructed such as by moulding from a natural or synthetic rubber material or from an elastomeric vinyl plastics material such as polyvinyl chloride or other suitable plastics material having properties desirable in the construction of milking inflations i.e. desirable resilient qualities and qualities facilitating cleaning and sterilising of the inflation without the inflation absorbing or retaining any of the cleaning or sterilising agents which could irritate an animal or contaminate milk received from the animal.

The inflations with which the invention are concerned have a resilient tubular body part 1 which merges into an upper integral head part 2 including an inwardly directed flange or collar 3 having an inner periphery defining the inflation mouth 4. The head part 2 further has a depending outer longitudinally extending annular flange 5 spaced from the body part 1 and located about a teat cup shell 6 within which the inflation body part 1 is contained. The teat cup shell 6 may be of metal or any other suitable rigid material and the outer flange 5 is arranged to seal on the upper outer part of the shell 6, the shell being cylindrical or substantially cylindrical in form.

The lower end portion 1a of the body part 1 is sealably engaged with and extends through an apertured lower end portion 6a of the teat cup shell 6, and may be provided with at least one pair of outer annular strengthening and sealing ribs 7 defining an annular groove in which the shell lower end portion 6a locates, and in some cases a plurality of ribs 7 and grooves can be provided to accommodate variances in the length of the teat cup shell 6 according to the particular manufacture. The teat cup shell 6 is of larger diameter than the inflation body part 1 so as to provide an annular space 8 thereabout between the upper and lower sealed portions and to which pulsating vacuum/air can be applied by way of an appropriate inlet 9. A tubular extension 10 to the lower end portion of the container body part is provided for connection to a main vacuum milk line; the arrangement illustrated shows an elongate integral extension 10, but some inflations may have a short connecting piece for the milk line and others an extension connected to the inflation lower end by a tubular joint piece.

In the first form of the invention shown in FIG. 1 of the drawings, the contained body part 1 of the inflation is of double co-axial barrel formation with the upper barrel part 11 defining the main teat engaging part of the inflation, and a lower end part 12 defining a secondary chamber 12a which is at least partially collapsible under pulsating vacuum pressure applied to the teat cup shell 6 to provide a pressure compensating effect and a rest period during the pulsating cycle of milking operations.

A double-barrelled milking inflation of this kind has been described in and is the subject of my U.S. Pat. No. 4,425,872 but in such prior inflation the contained body part has a junction between the upper main teat receiving barrel part and the lower compensating barrel part 12 which is waisted considerably internally and having a substantially thickened wall section, in providing the main teat receiving barrel part with a lower gradually reducing diameter inner end surface forming a positive abutment for the lower end of an animal's teat engaged with the inflation to thus limit the amount of upward travel of the inflation during "teat cup crawl".

The thickened wall portion at the junction between the upper and lower barrel parts of the prior inflation is provided to prevent collapse of the bore communicating with the main milk outlet (via the compensating lower barrel part), but it has been found in some instances that the animal's teat end can block the opening to the bore and the constant vacuum applied in the milk line may cause vacuum stress at the teat end, and by partially dragging the teat end into the bore opening the animal may be caused discomfort and/or milk outlet orifice or canal may be restricted and letdown of milk not efficiently effected. This problem was partially overcome by providing at least one pressure relieving slot at the thickened wall part of the junction.

However, research has shown a further problem causing discomfort to animals (and in some cases teat infection), and affecting milk supply, is turbulence in milk flow and milk droplets at the teat end. Accordingly, the present invention aims at overcoming this and the previously referred to problems, by providing an inflation shaped to obtain a good grip on the teat to prevent accidental dislodgement and minimise crawl, without the need for an over-tight collar part, and at the same time to spread vacuum pressure evenly over a large area of the teat end; and in the first form to provide space for the dispersing of milk droplets away from the teat end with an outlet streamlining milk flow from the inflation.

In this first form of the invention, the junction part 13 is only very slightly waisted by a fractional thickening of the junction wall so that the bore 15 is of larger diameter than the milk outlet bore 10a and slightly less than the bore diameter of the inflation upper and lower sections 11 and 12; and so that when the inflation is engaged on an animals teat (as indicated in broken outline at 16 in FIG. 1) the major part of the surface area of the teat end is exposed to vacuum pressure. The inflation upper section 11 is dimensioned (length and diameter) to accommodate an average cows teat and has its side wall shaped so as to define a plurality of concentric annular shallow ripples or undulations 11a on its inner surface and spaced at regular intervals along at least a major part of the length of the upper barrel section 11 so that an animals teat 16 to which the inflation is fitted may be subject to a massaging effect as the pulsating vacuum/air pressure is applied to the teat cup shell 6. As indicated by way of example in FIG. 2A, the wall of the upper barrel section 11 can be of uniform thickness with the inner and outer surfaces 11a' and 11b', respectively, parallel; but preferably (as illustrated in FIGS. 1 and 2 in particular) the outer surface 11b does not follow the inner surface ripples or undulations 11a but is straight longitudinally so that the wall thickens at the inwardly directed part of each ripple or undulation 11a to provide slightly more resistance to collapse at each such point and improve the massage effect and provide for firm gripping of the teat 16.

Further, in the preferred form of the invention illustrated in FIGS. 1 and 2, the upper barrel section 11 is preferably tapered inwardly from its upper end part to its lower end part and the intermediate junction 13 so that the inflation 1 is further resistant to upward crawl; in particular the wall thickening 14 at each inwardly directed ripple or undulation 11a in combination with the taper provides an arrangement resistant to upward crawl of the inflation, as the minimum bore at each ripple or undulation gradually decreases from the uppermost to the lowermost ripple or undulation, ' and maintains a positive grip on the teat 6 during operation to guard against accidental detachment. The angle of taper of the upper section wall may be in the region of about 2° to the longitudinal axis of the inflation 1, and there are at least three and preferably about four or five ripples or undulations 11a along the length of the upper barrel section 11—the intermediate junction 13 may be similar in formation to and form a lowermost ripple with the narrowest minimum bore 15 restricting the animals teat 6 from fully entering the chamber 12a of lower barrel section 12 whilst allowing vacuum pressure in the milk line to be applied over a large area of the teat end.

Figure 4:
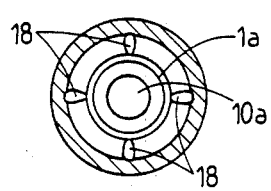
FIG. 4 is a plan view on line IV—IV of FIG. 1.

The first form of the inflation preferably has its collar formed or shaped in accordance with the inflation collar disclosed in my U.S. Pat. No. 4,457,262 and in particular the constructions according to FIG. 4 or FIG. 5 of that specification (and as indicated particularly in FIG. 1A of the present specification). In such constructions the inwardly directed collar part 3 is inclined inwardly and upwardly towards the inflation mouth 4 and has an inwardly and downwardly inclined lip or flange portion 3a defining such inflation mouth 4; a major part of the inner face 3b of such inclined lip 3a presenting either a plain flat frusto-conical face (as shown in full) or a lower part frusto-conical face and an inwardly directed upper bulge (as shown in broken line in FIG. 1A) for engaging the animals teat 16, and the lower end part of the lip or flange 3a terminating in a relatively sharp angled edge part 3c and adjacent inner rounded part 3d forming positive seal surfaces as the inflation 16 flexes and moves during milking operations.

It will be appreciated by those skilled in research in this field that inflation dimensions can in parts be critical and/or that very small variances can make marked differences to the affect on an animals teat and milking performance. Research indicates that in the present inflation suited particularly to average New Zealand cows, the diameter A at the widest point of the inflation mouth 4 and at the upper end or inner mouth part of the upper teat engaging section 11 may be 25 to 28 millimeters; the diameter A' at the upper commencement of frusto-conical face 3b of the mouth lip or flange 3a may be 23 millimeters and the diameter A" at the inner lower edge of such face 19 millimeters; the diameter B at the lower end of the upper section 21 to 22 millimeters; the minimum bore diameter C at the junction 13 may be 19.8 millimeters where B is 21 millimeters to 21.2 millimeters where B is 22 millimeters; the inflation lower section or barrel 12 can be parallel for at least the major part of its length F and can have a bore diameter B' the same as or close to the upper section lower end diameter B e.g. 21 millimeters, or a diameter fractionally more or less. The wall thickness of the lower section 12 can be 2.6 millimeters and the wall thickness of the upper section 11 can be 2.6 millimeters at its thinnest at the trough of each ripple or undulation 11a and 3.2 millimeters at the peaks, with the distance between peaks and troughs preferably the same at 10 millimeters to be similarly affected by the same outer vacuum pressure but with the thicker peak areas (in this case being 0.6 millimeters thicker) being stronger and able to retain a firm grip on the animals teat 16. With equal spacing of the troughs and peaks and the tapered form of the upper section 11, the bore diameter will progressively decrease from top to bottom.

The construction is also arranged to permit collapse of the lower barrel or section 12 in relieving excess vacuum applied to the teat 16 during the milking cycle. The wall thickness at the junction 13 may be increased to 3.4 millimeters which is sufficient to at least partly resist excess collapsing and squeezing of the teat end, without being too rigid.

Other suitable relevant dimensions lengthwise of the inflation can be:

Length K (upper outer end to inner mouth and above upper periphery of the shell 6) 15 mm to 18 mm Length J of the inner mouth parallel part—5 mm to 30 mm (variable with length F)

Length H of the tapered upper section 11—80 mm

Length G of the junction part 13—20 mm

Length F of the lower barrel section 12 parallel wall part—5 mm to 15 mm

Whilst it is anticipated that inflations having the aforementioned dimensions will lead to superior performance for a wide range of cows in New Zealand, it will be appreciated that variances can be made to suit particular breeds or other requirements.

If so desired, the slightly thicker wall of the junction part 13 can be relieved by a plurality, e.g. four, of equally spaced shallow recesses 7 extending longitudinally of the inflation.

The width and length of the lower barrel or section 12 provides a relatively large space for the movement of milk droplets so that such droplets are dispersed away from the teat end; and in one arrangement with the bore of the outlet conduit 10 parallel, the junction 1a between the lower section 12 and milk outlet conduit 10 can be provided with a communicating bore D smaller in diameter than the lower section chamber 12a diameter B' and larger in diameter than the diameter E outlet bore 10a, with tapering rounded upper and lower end parts providing for smooth flow of milk from the lower chamber 12a (which acts as a milk surge chamber) to the milk outlet conduit 10—in this arrangement the diameter D may be 15 to 16 millimeters and the diameter E 11 to 12 millimeters. The junction bore D can be parallel as shown or alternatively tapered inwardly towards the outlet conduit bore. In an alternative arrangement the afore-described stepped outlet bore 10a can be dispensed with and a uniformly tapered bore 10a provided with the diameter D of the communicating part of the bore being 13 millimeters and the diameter E' at the lower end of the outlet bore 10a can be between 9 and 10 millimeters.

Another variation to assist in streamlining milk flow may be the provision of a plurality of equally spaced slots or recesses 18 extending and tapering longitudinally of the inflation in the upper wall of the junction 12 to communicate with the lower section chamber 12a.

The first form of the present invention with slight wall thickness increase at the inner junction 13 permitting at least some resilience at the partial collapsing of the junction part, and the general arrangement described and illustrated with reference to FIGS. 1 to 4 inclusive, enables the employment of a very much shorter compensating lower barrel part or section 12 and inflation overall compared with the inflation of specification 4,425,872 and the inflation is thus usable with a large range of existing and standard teat cup shells.

There is however a range of teat cup shells commonly used in some countries (e.g. the United States of America), and/or preferred by some dairy farmers/operators, which are of a relatively short variety such that body parts 1 of the inflations therefor housed within such shells may substantially fully accommodate an animals teat and may not have sufficient length to incorporate fully the afore-described and illustrated lower barrel part 12. Accordingly, for such shorter shells dimension F can be reduced to zero or close to zero so that the previously described 'junction part' 13 becomes simply the lower ripple or undulation 11a and the surge chamber 12a is defined by and reduced to the lowest ripple or undulation trough. All or most of the other features and/or dimensions referred to can be the same as or similar to those first described except that dimension J may also be reduced/increased as necessary. Also, the particular inflation described and illustrated with reference to FIGS. 1 to 4 incorporates one preferred design of inflation mouth and collar part designed to enable a secure grip on the animal's teat without surface pressure being applied thereto, but the rippled inflation of the present invention may incorporate various of the features of inflation collars described in other of my various earlier U.S. patent specifications or alternative collars according to particular requirements or preferences on the part of a user.

Figure 5:
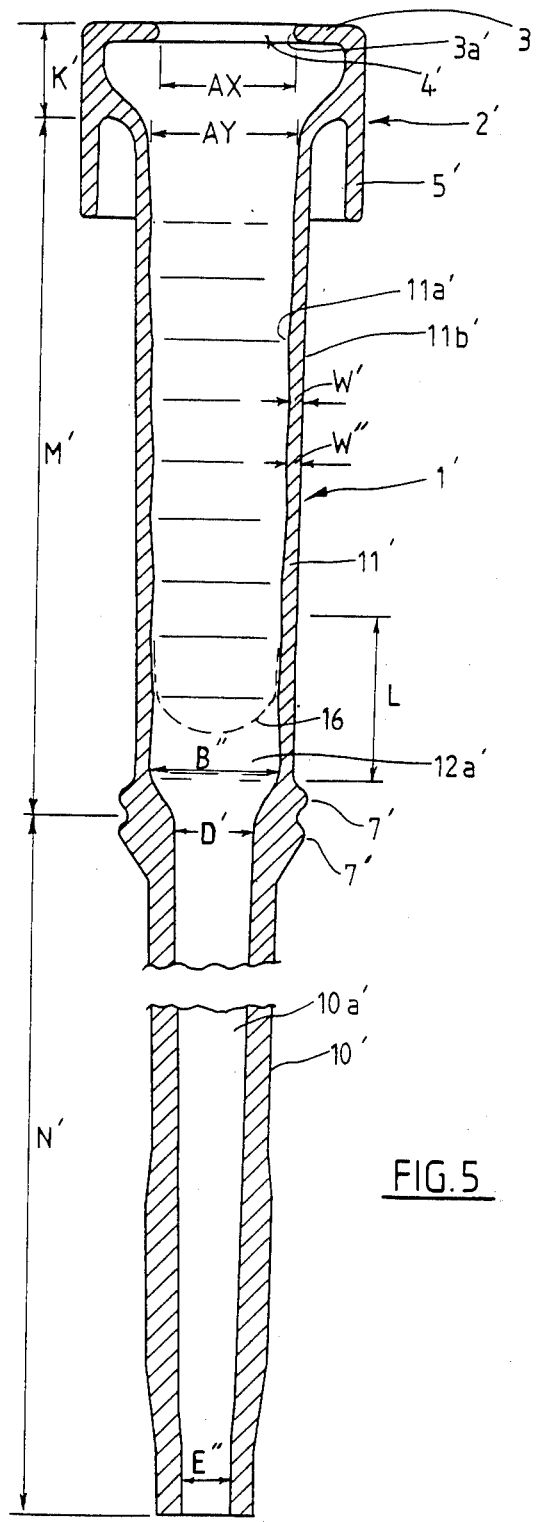
FIG. 5 is a longitudinal sectional view of another form of the invention.

Accordingly, a further example of a milking inflation suited to the shorter teat cup shells and incorporating a simple standard type collar is illustrated in FIG. 5 of the accompanying drawings. In this form of inflation the collar 3' of the head part 2' may be plain and flat and extend horizontally inwardly to have a plain rounded inner periphery 3a' defining the inflation mouth 4'. As last proposed, the inner surface ripples or undulations 11a' (five are illustrated) extend over substantially the full inner length of the inflation body part 1' so that the lowest trough of the lowest ripple or undulation 11a' defines a small milk droplet surge chamber 12a', the said lowest ripple or undulation 11a' will for most animals serve as the partial abutment preventing the lower end part of the animals teat being drawn into the outlet bore 10a upper end whilst allowing vacuum pressure to be applied over a relatively large area of such teat end. This further illustrated example has the alternative tapered outlet bore 10a' communicating directly with the lower end of the body part interior or surge chamber 12a'.

Examples of dimensions for this alternative inflation are:

Diameter AX at the collar mouth—22 mm

Diameter AY at the body part inner mouth and start of the ripples or undulations—25 mm Diameter B" at the lowest ripple trough and surge chamber 12a'—22 mm Diameter D' at the upper end of the outlet bore 10a'—13 mm Diameter E" at the lower end of the outlet bore 10a'—9.4 mm Length K' from the upper outer end to the inner mouth and above the upper periphery of the shell—15 mm to 18 mm Minimum wall thickness W' at troughs—2.2 mm Maximum wall thickness W''' at peaks—2.6 mm As with the first form of the inflation, the distances between the peaks and troughs of the ripples or undulations 11a' may be the same at 10 millimeters but the body part 1' taper may only extend down to a point 29 mm to 30 mm above the upper reinforcing rib 7', and the remaining 29 mm to 30 mm of the outer wall 11b' at such lower end (length L) can be parallel. The lengths M and M' of the respective body parts 1 and 1' for engagement within the teat cup shells may vary according to particular types of shells but one example is M=135 mm to 136 mm for typical New Zealand type shells and M'=116 mm to 118 mm for a typical range of shells used in the United States of America. The overall length of both forms of inflation (including the tubular outlet extensions 10 and 10') can be varied considerably, but in two examples lengths N and N' of the extensions 10 and 10' are respectively 154 mm and 137 mm. Wall thicknesses for both kinds of the inflation can be similarly varied and the dimensions given for wall thicknesses at the peaks and troughs of the ripples or undulations of the first form can be substituted for those of the second form, and vice versa; and further alternative wall thickness dimensions for either or both forms are 2.4 mm at the troughs and 2.8 mm at the peaks of the ripples or undulations.

Particular forms of the invention have been described and illustrated by way of example, but it will be appreciated that still further variations of and modifications to the invention can take place without departing from the scope of the appended claims.

I claim:

1. A teat cup milking inflation of the kind referred to and comprising a resilient upright substantially cylindrical tubular body part arranged to be located and contained within an upright rigid substantially cylindrical tubular shell with upper and lower portions of the body part being respectively sealably engageable with upper and lower parts of the shell, and annular space being formed about the contained body part and to which a pulsating vacuum or pressure can be applied; said contained body part being arranged for location about an animal's teat and having an open upper collar part defining the inflation mouth for teat entry, and the lower portion of the body being provided with a milk outlet connectable to a vacuum milk line; said tubular body part being characterized by having a generally tapering formation along at least a major part of its length and by the provision on its inner wall surface of a plurality of annular ripples or undulations at intervals therealong with the minimum bore diameters of the ripples or undulations progressively decreasing from the uppermost ones to the lowermost of said ripples or undulations; the lowermost ripple or undulating terminating in close proximity to the milk outlet at the lower end of the contained body part with the lower trough of said lowermost ripple merging into a small chamber above said outlet and below the lower end of the animal's teat when located within the contained body part, and said milk outlet being of substantially lesser diameter than the lowermost ripple or undulation.

2. A teat cup milking inflation as claimed in claim 1 wherein said contained body part is formed into a main upper section having the plurality of ripples or undulations, and a communicating lower section defining said small chamber below the lowermost ripple or undulation and having its lower end part provided with the milk outlet connectable to a vacuum milk line; said lower section and chamber being collapsible under pulsating vacuum/pressure.

3. A teat cup milking inflation as claimed in claims 1 or 2 wherein the contained body part has a substantially uniform wall thickness over its length incorporating the ripples or undulations so that the outer wall surface remains substantially parallel to the inner wall surface over at least the major part of such length.

4. A teat cup milking inflation as claimed in claims 1 or 2, wherein the outer wall of the contained body part tapers inwardly uniformly from the uppermost ripple or undulation to the lowermost ripple or undulation in providing wall thickening at the peaks of said ripples or undulations.

5. A teat cup milking inflation as claimed in claims 1 or 2 wherein the peak area of said lowermost ripple or undulation is provided with a plurality of equally and concentrically spaced vacuum pressure relieving slots or recesses.

6. A teat cup milking inflation as claimed in claims 1 or 2, wherein the inner wall surface at the junction of the small chamber and the milk outlet of the contained body part is of rounded form progressively decreasing in diameter towards the outlet, and such junction inner surface is provided with a plurality of equally concentrically spaced longitudinally disposed slots or recesses for improving milk flow.

* * * * *